(12) United States Patent
Bruls et al.

(10) Patent No.: US 9,654,759 B2
(45) Date of Patent: May 16, 2017

(54) METADATA FOR DEPTH FILTERING

(71) Applicant: KONINKLIJKE PHILIPS N.V., Eindhoven (NL)

(72) Inventors: Wilhelmus Hendrikus Alfonsus Bruls, Eindhoven (NL); Patrick Luc Els Vandewalle, Eindhoven (NL); Philip Steven Newton, Eindhoven (NL); Bart Kroon, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 303 days.

(21) Appl. No.: 14/415,695

(22) PCT Filed: Jul. 12, 2013

(86) PCT No.: PCT/IB2013/055750
§ 371 (c)(1),
(2) Date: Jan. 19, 2015

(87) PCT Pub. No.: WO2014/013405
PCT Pub. Date: Jan. 23, 2014

(65) Prior Publication Data
US 2015/0181195 A1    Jun. 25, 2015

Related U.S. Application Data

(60) Provisional application No. 61/673,934, filed on Jul. 20, 2012.

(51) Int. Cl.
*G06K 9/00* (2006.01)
*H04N 13/00* (2006.01)

(52) U.S. Cl.
CPC ..... *H04N 13/0022* (2013.01); *H04N 13/0048* (2013.01); *H04N 13/0059* (2013.01); *H04N 13/0062* (2013.01); *H04N 13/0066* (2013.01)

(58) Field of Classification Search
CPC ......... G06T 2207/10052; G06T 7/0065; G06T 7/0075; G06T 2207/10012
(Continued)

(56) References Cited

U.S. PATENT DOCUMENTS 7,126,598 B2 * 10/2006 Oh ........................ G06T 15/10
345/419
7,477,777 B2 * 1/2009 Wells .................... G06T 7/0081
345/419
(Continued)

FOREIGN PATENT DOCUMENTS

| WO | 03061216 A1 | 7/2003 |
| WO | 2010010499 A1 | 1/2010 |
| WO | 2013150491 A1 | 10/2013 |

OTHER PUBLICATIONS

Shimizu, Shinya et al "Real-Time Free-Viewpoint Viewer from Multiview Video Plus Depth Representation Coded by H.264/AVC MVC Extension", NTT Cyber Space Laboratories, NTT Corpration, 3DTV-CON, IEEE 2009.
(Continued)

*Primary Examiner* — Yosef Kassa

(57) ABSTRACT

A 3D video system transfers video data from a video source device (40) to a destination device (50). The destination device has a destination depth processor (52) for providing destination depth data. The source device provides depth filtering data including filter location data, the depth filtering data representing a processing condition for processing the destination depth data in a filter area of the video indicated by the filter location data. The destination depth processor (52) is arranged for processing, in dependence on the depth filtering data, the destination depth data in an area of the video indicated by the filter location data. The depth filtering data enables the rendering process to improve the quality of the depth data.

15 Claims, 6 Drawing Sheets

(58) Field of Classification Search
USPC ........ 382/128, 154, 260, 274, 275; 345/419, 345/653, 664, 679
See application file for complete search history.

(56) References Cited

U.S. PATENT DOCUMENTS

| | | | | |
|---|---|---|---|---|
| 7,788,684 | B2 * | 8/2010 | Petrovic | H04H 20/14 713/176 |
| 8,180,145 | B2 * | 5/2012 | Wu | G06T 7/0077 382/103 |
| 8,619,082 | B1 * | 12/2013 | Ciurea | H04N 13/0022 345/427 |
| 8,655,052 | B2 * | 2/2014 | Spooner | G06T 7/0065 345/419 |
| 8,682,107 | B2 * | 3/2014 | Yoon | H04N 13/026 382/154 |
| 2010/0166338 | A1 | 7/2010 | Lee | |

OTHER PUBLICATIONS

"Call for Proposals in 3D Video Coding Technology", MPEG DOC. N12036, Mar. 2011.

Stefanoski, Nikolce et al "Description of 3D Video Coding Technology Proposal" Disney Research Zurich and Fraunhofer HHI, MPEG Doc. M22668, Nov. 2011.

Scharstein, Daniel et al A Taxonomy and Evaluation of Dense Two-Frame Stereo Correspondence Algorithms, Microsoft Research, Technical Report, MSR-TR-2001-81, Nov. 2001.

* cited by examiner

METADATA FOR DEPTH FILTERING

CROSS-REFERENCE TO PRIOR APPLICATIONS

This application is the U.S. National Phase application under 35 U.S.C. §371 of International Application No. PCT/IB2013/055750, filed on Jul. 12, 2013, which claims the benefit of U.S. Provisional Patent Application No. 61/673,934, filed on Jul. 20, 2012. These applications are hereby incorporated by reference herein.

FIELD OF THE INVENTION

The invention relates to a video source device for providing a video signal representing video for transferring to a three dimensional [3D] video destination device. The source device has an output unit for generating the video signal, and for transferring the video signal to the destination device. The destination device has a receiver for receiving the video signal, and a destination depth processor for providing destination depth data.

The invention further relates to a 3D video destination device, a method of providing and processing a 3D video signal, a video signal and a method of processing the video signal.

The invention relates to the field of generating and transferring a video signal at a source device, e.g. a broadcaster, internet website server, authoring system, manufacturer of Blu-ray Disc, etc., to a 3D destination device, e.g. a Blu-ray Disc player, 3D TV set, 3D display, mobile computing device, etc., that requires depth data for rendering 3D video.

BACKGROUND OF THE INVENTION

The document "Real-time free-viewpoint viewer from multiview video plus depth representation coded by H.264/AVC MVC extension, by Shinya Shimizu, Hideaki Kimata, and Yoshimitsu Ohtani, NTT Cyber Space Laboratories, NTT Corporation, 3DTV-CON, IEEE 2009" describes 3D video technologies in addition to MPEG coded video transfer signals, in particular Multi View Coding (MVC) extensions for inclusion of depth maps in the video format. MVC extensions for inclusion of depth map(s) video coding allow the construction of bitstreams that represent multiple views with related multiple supplemental views, i.e. depth map views. According to the document depth maps may be added to a 3D video data stream having first video information representing a left eye view on a 3D display and second video information representing a right eye view on the 3D display. A depth map at the decoder side enables generating of further views, additional to the left and right view, e.g. for an auto-stereoscopic display.

Furthermore, the 3D video destination device may have, for providing destination depth data such as a depth map, a 2D to 3D converter for generating 3D video data from a 2D video signal, or a depth map generator for generating a depth map from a video signal comprising a left eye view and a right eye view.

SUMMARY OF THE INVENTION

From the above it appears that video material may be provided with depth data by including a depth map or other depth data before transmission, or by generating depth data at the destination. However, transferring additional depth data requires data transmission capacity, and the depth data generated at the destination may have low quality.

It is an object of the invention to provide depth data at the destination side that has adequate quality without transferring such depth data with the video data.

For this purpose, according to a first aspect of the invention, the source device as described in the opening paragraph, comprises a source depth processor for providing depth filtering data including filter location data, the depth filtering data representing a processing condition for processing the destination depth data in a filter area of the video indicated by the filter location data, and the output unit is arranged for transferring the depth filtering data to the destination device.

For this purpose, in the destination device, the destination depth processor is arranged for processing, in dependence on the depth filtering data, the destination depth data in an area of the video indicated by the filter location data.

For this purpose, the method of providing a video signal representing video for transferring to a 3D video destination device, comprises generating the video signal and transferring the video signal to the destination device, providing depth filtering data including filter location data, the depth filtering data representing a processing condition for processing the destination depth data in a filter area of the video indicated by the filter location data, and transferring the depth filtering data to the destination device.

For this purpose, the method of processing the video signal representing video received from a video source device comprises receiving the video signal, providing destination depth data, processing, in dependence on the depth filtering data, the destination depth data in an area of the video indicated by the filter location data.

For this purpose, the video signal representing video for transferring to a 3D video destination device comprises depth filtering data including filter location data, the depth filtering data representing a processing condition for processing the destination depth data in a filter area of the video indicated by the filter location data.

The measures have the effect that the destination device is enabled to receive the depth filtering data and to process, in dependence on the depth filtering data, the destination depth data in an area of the video indicated by the filter location data. Hence an improved version of destination depth data is obtained by locally performing a specific filter operation in a specific area of the image.

In particular, both the specific filter operation and the specific area are controlled at the source side, for example by a broadcaster or an author. At the source side high quality depth data and/or virtually unlimited processing (e.g. offline) resources are available. However, as the transmission channel is limited, not all data available at the source can be transferred to the destination side. Instead of transmitting a full set of depth data, depth data must be provided locally at the destination side (e.g. created from 2D video, reconstructed from L/R stereo video or supplemented based on a low resolution or incomplete version of the depth map). The source side is aware of the problem areas where traditionally providing the depth data at the destination side will fail and/or where disturbing artifacts may occur. Advantageously, by transferring the depth filtering data including the specific location and specific filter or problem the source side can effectively assist the destination side in the process of creating depth data, e.g. generate a destination depth map for warping of multiple views to be displayed on a 3D display. Hence, when and where available, the depth filtering data is applied to enhance the destination depth data.

Effectively the destination device is provided with additional depth processing data under the control of the source, for example filter parameters or instructions, which data enables the source to control and enhance the processing of the destination depth data. Advantageously the depth filtering data is generated at the source where substantial processing resources are available, and off-line generation is enabled. The processing requirements at the destination side (i.e. at the consumer side) are reduced, and the 3D effect is enhanced because the depth data is optimized.

Optionally the source depth processor is arranged for providing, in the depth filtering data, a filter type including at least one of
  a temporal median filter over N frames;
  a spatial median, maximum, or minimum filter over M×N pixels;
  a Gaussian blur over M×N pixels;
  a Gaussian blur over a one dimensional kernel;
  a threshold filter for thresholding to at least one fixed value;
  a bilateral grid filter and an object mask for the bilateral grid filter;
  a gain or offset for the filter area.

Advantageously the specific filter type that provides the optimal improvement in the specific area is selected at the destination side, and transferred to the destination side to be applied.

Optionally the source depth processor is arranged for providing, in the depth filtering data, a filter selection indicator including at least one of
  a temporal instability indicator indicative of an amount of motion in the filter area;
  an alignment indicator indicative of an amount of alignment between depth and luminance and/or chrominance;
  a graphic object indicator indicative of at least one graphic object in front of background video in the filter area.

Advantageously the filter selection indicator is indicate of a specific detrimental effect or problem that occurs in the specific area of the video, and enables the destination side to activate an appropriate filter operation to compensate for the detrimental effect.

Optionally the source depth processor is arranged for providing, in the depth filtering data, the filter parameter data including at least one of
  filter coefficients;
  filter strength;
  parameters of the video in the filter area;
  parameters of a graphical object in the area.

Advantageously transferring the filter parameter data to be applied at the destination side is a very compact way to assist the destination side in optimizing the filter operation, which requires relatively very little data transmission capacity.

Optionally the source depth processor is arranged for providing, in the depth filtering data, the filter location data including at least one of
  a rectangular area indicating coordinates and/or width and height;
  a two dimensional shape of a predetermined shape type, the shape type including at least one of a square, a circle, an ellipse, the location of the two dimensional shape indicated by at least a centre and radius;
  a one dimensional shape, the location of the one dimensional shape indicated by at least one of coordinates of at least one point, a length, a direction including one of horizontal, vertical or angle;
  a border area type indicating a transition between the filter area and surrounding video;
  an area index identifying the respective filter area;
  a geometric area for a bilateral depth filter;
  object index parameters associated with a filter area to identify objects.

Advantageously the specific area where the filter operation is to be performed is described by a low number of geometric parameters, which requires relatively very little data transmission capacity.

Optionally the source depth processor is arranged for providing, in the depth filtering data, a filter activity indicator including at least one of
  a start indicator indicative of a video frame to start filter processing;
  a stop indicator indicative of a video frame to stop filter processing;
  a period indicator indicative of period of time to apply filter processing;
  an activity index indicative of applying filter processing in a filter area corresponding to the index.

Advantageously the source side is enabled to control the period of time that the filter operation is to be performed, without repeating the data for each video frame.

Optionally the output unit is arranged for generating, as the video signal, at least one of
  a display signal for interfacing to a 3D display device;
  a transfer signal for transferring via a broadcast network or internet;
  a record carrier signal represented by optically readable marks on a record carrier.

Advantageously different practical source devices in a video transfer chain (from original authoring up to final rendering on a 3D display in front of the viewer) are enhanced by including the depth filtering data features.

Optionally the destination depth processor comprises, for providing the destination depth data, at least one of
  a 2D to 3D converter for generating 3D video data from a 2D video signal;
  a depth map generator for generating a depth map from a video signal comprising first video information representing a left eye view on a 3D display, and second video information representing a right eye view on the 3D display;
  a view warper for warping of multiple views for an autostereoscopic 3D display.

Furthermore, the destination device may comprise at least one of
  a read unit (58) for reading a record carrier for receiving the video signal,
  a 3D display (63) for displaying of 3D video data.

Advantageously different practical destination devices in the video transfer chain are enhanced by including the depth filtering data features.

Furthermore, the destination device, the method of providing a video signal, the video signal as such, the method of processing the video signal, and corresponding computer program products, may be enhanced by including the various options described above with reference to the source device.

Further preferred embodiments of devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
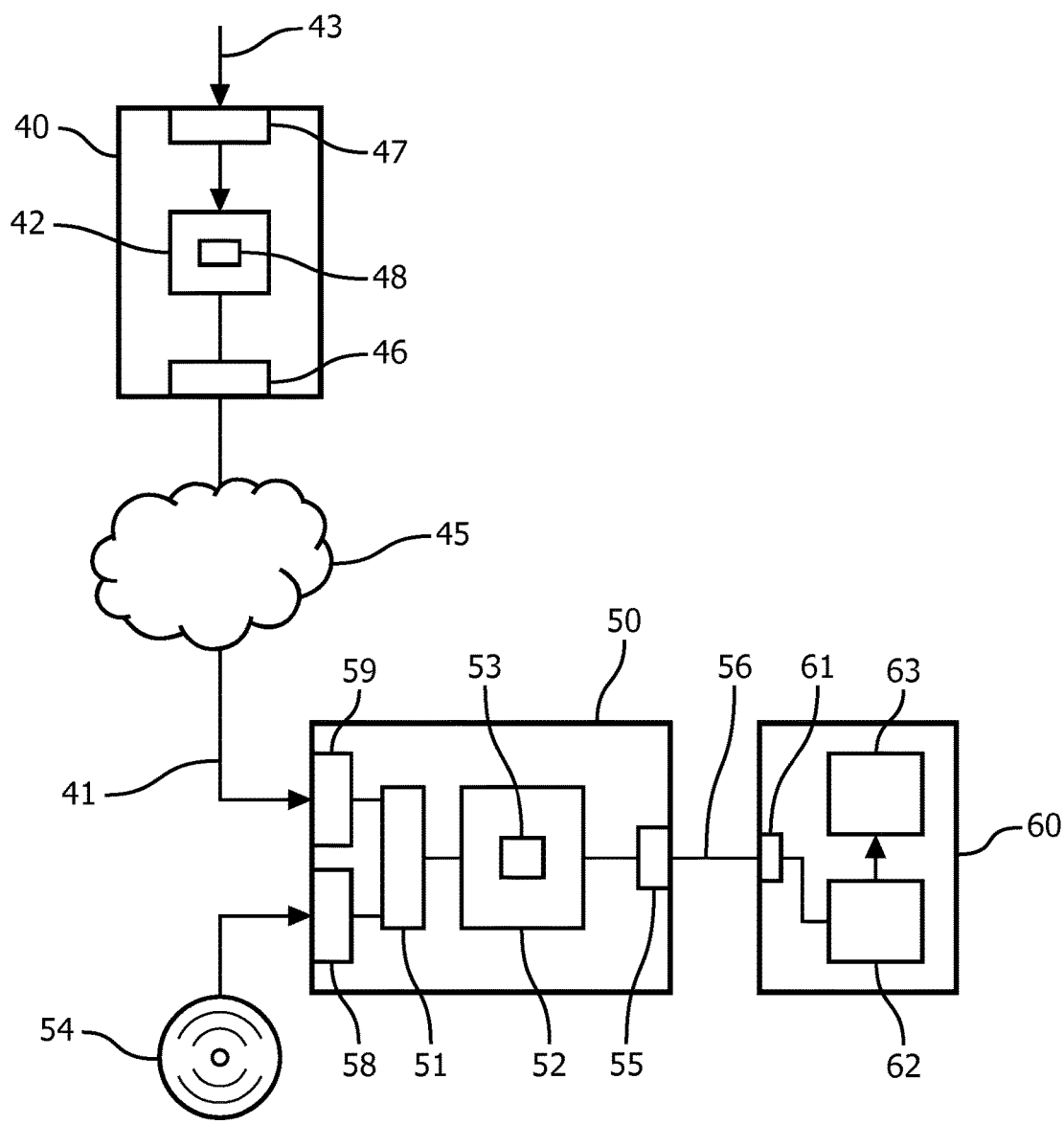
FIG. 1 shows a system for processing 3D video data and displaying the 3D video data.

The invention involves providing depth filtering data, as described further below, at the source side and transferring the depth filtering data to the destination side for enhancing the 3D effect by processing the depth data at the destination. Such transfer may be performed in various ways. For example, the depth filtering data may be included in the 3D video signal itself. Also, the depth filtering data may be transferred as a separate signal but using the same transfer medium. Also, the depth filtering data may be transferred separately, e.g. via the internet, while the main 3D video data is transferred otherwise, e.g. via broadcast or a 3D version of the BD. Such separate transfer enables improving the 3D quality of existing 3D material already in the possession of the viewer, or 3D material transferred separately or at a different time to the viewer. Any way of transferring video data and depth filtering data from the source to the destination may be called transferring a video signal, and a video signal may contain one or more of the 3D video components or may comprise different signals for separately transferring respective components.

There are many different ways in which video signal for 3D video may be formatted and transferred, according to a so-called 3D video format. Some formats are based on using a 2D channel to also carry stereo information. In the 3D video signal the image is represented by image values in a two-dimensional array of pixels. For example the left and right view can be interlaced or can be placed side by side or top-bottom (above and under each other) in a frame. Also a depth map may be transferred, and possibly further 3D data like occlusion or transparency data. A disparity map, in this text, is also considered to be a type of depth map. The depth map has depth values also in a two-dimensional array corresponding to the image, although the depth map may have a different resolution. The 3D video data may be compressed according to compression methods known as such, e.g. MPEG. Any 3D video system, such as internet or a Blu-ray Disc (BD), may benefit from the proposed enhancements. Also the 3D video signal transferred between a 3D source like a Blu-Ray player and a destination device like a 3D display or TV set, e.g. based on HDMI, may be enhanced.

The 3D display can be a relatively small unit (e.g. a mobile phone), a large Stereo Display (STD) requiring shutter glasses, any stereoscopic display (STD), an advanced STD taking into account a variable baseline, an active STD that targets the L and R views to the viewers eyes based on head tracking, or an auto-stereoscopic multiview display (ASD), etc.

Usually transmitting 3D video entails compression and transmission of more than one view (camera signal) and its corresponding depths, for example as discussed in "Call for Proposals on 3D Video Coding Technology"—MPEG document N12036, March 2011, Geneva, Switzerland. Auto-conversion in the decoder (depth automatically derived from stereo) by itself is known, e.g. from "Description of 3D Video Coding Technology Proposal by Disney Research Zurich and Fraunhofer HHI", MPEG document M22668, November 2011, Geneva, Switzerland. Views need to be warped for said different types of displays, e.g. for ASD's and advanced STD's for variable baseline, based on the depth data in the 3D signal. However the quality of views warped based on the various types of depth data may be limited.

The video signal may for example be a TV broadcast signal enhanced for 3D such as a standard stereo transmission using ½ HD frame compatible, multi view coded (MVC) or frame compatible full resolution (e.g. FCFR as proposed by Dolby Laboratories, Inc.). Building upon a frame-compatible base layer, Dolby developed an enhancement layer to recreate the full resolution 3D images. This technique has been proposed to MPEG for standardization and requires only a ~10% increase in bitrate. The traditional 3D video signal is enhanced by depth filtering data as elucidated below.

FIG. 1 shows a system for processing 3D video data and displaying the 3D video data. A first video device, called video source device 40, provides and transfers a video signal 41 to a further image processing device, called 3D video destination device 50, which is coupled to a 3D display device 60 for transferring a 3D display signal 56.

FIG. 1 further shows a record carrier 54 as a carrier of the enhanced video signal. The record carrier is disc-shaped and has a track and a central hole. The track, constituted by a pattern of physically detectable marks, is arranged in accordance with a spiral or concentric pattern of turns constituting substantially parallel tracks on one or more information layers. The record carrier may be optically readable, called an optical disc, e.g. a DVD or BD (Blu-ray Disc). The information is embodied on the information layer by the optically detectable marks along the track, e.g. pits and lands. The track structure also comprises position information, e.g. headers and addresses, for indication the location of units of information, usually called information blocks. The record carrier 54 carries information representing digitally encoded 3D image data like video, for example encoded according to the MPEG2 or MPEG4 encoding system, in a predefined recording format like the DVD or BD format.

The source device has a source depth processor 42 for processing 3D video data, received via an input unit 47. Input 3D video data 43 may be available from a storage system, a recording studio, from 3D camera's, etc. The source system may process a depth map provided for the 3D image data, which depth map may be either originally present at the input of the system, or may be automatically generated by a high quality processing system as described below, e.g. from left/right frames in a stereo (L+R) video signal or from 2D video, and possibly further processed or corrected to provide a source depth map that accurately represents depth values corresponding to the accompanying 2D image data or left/right frames.

The source depth processor 42 generates the video signal 41 comprising the video data. The video signal may have first video information representing a left eye view on a 3D display, and second video information representing a right eye view on a 3D display. The source device may be arranged for transferring the video signal via an output unit 46 and to a 3D destination video device, or for providing a video signal for distribution, e.g. via a record carrier. The video signal is based on processing the input video data 43, e.g. by encoding and formatting the 3D video data according to a predefined format.

The source device may have a source stereo-to-depth converter 48 for generating a generated depth map based on the first and second video information. A stereo-to-depth converter for generating a depth map, in operation, receives a stereo 3D signal, also called left-right video signal, having a time-sequence of left frames L and right frames R representing a left view and a right view to be displayed for respective eyes of a viewer for generating a 3D effect. The unit produces a generated depth map by disparity estimation of the left view and the right view, and may further provide a 2D image based on the left view and/or the right view. The disparity estimation may be based on motion estimation algorithms used to compare the L and R frames, or on perspective features derived from the image data, etc. Large differences between the L and R view of an object are converted into depth values in front of or behind the display screen in dependence of the direction of the difference. The output of the generator unit is the generated depth map.

The generated depth map, and/or the high quality source depth map may be used to determine depth filtering data required at the destination side. The source depth processor 42 is arranged for providing the depth filtering data according to various optional embodiments, as discussed now.

The depth filtering data may be generated based on detecting in which area of the video depth errors are detected, when depth data will be provided at the destination side. Furthermore, the expected errors are determined to be disturbing to a viewer e.g. when a difference between the source depth map and a generated depth map at the destination side exceeds a predetermined threshold. For example, a predetermined depth difference may constitute said threshold. The threshold may also be made dependent on further image properties which affect the visibility of depth errors, e.g. local image intensity or contrast, or texture. The threshold may also be determined by detecting a quality level of the destination depth map as follows. The destination depth map is used to warp a view having the orientation corresponding to a given different view. For example, an R' view is based on the original L image data and the generated depth map. Subsequently a difference is calculated between the R' view and the original R view, e.g. by the well known PSNR function (Peak Signal-to-Noise Ratio). PSNR is the ratio between the maximum possible power of a signal and the power of corrupting noise that affects the fidelity of its representation. Because many signals have a very wide dynamic range, PSNR is usually expressed in terms of the logarithmic decibel scale. The PSNR may be used now as a measure of quality of generated depth map. The signal in this case is the original data R, and the noise is the error introduced by warping R' based on the generated depth map. Furthermore, the threshold may also be judged based on further visibility criteria, or by an editor authoring or reviewing the results based on the generated depth map, and controlling which sections and/or periods of the 3D video need to be augmented by depth filtering data.

The depth filtering data represents depth processing conditions for enhancing the depth data at the destination side. For example, the edges of objects in the video data have to be aligned with corresponding depth differences. However, when applying depth map generation from L/R video, some of the edges may be expected to be not aligned. Then depth filter data, in particular a suitable alignment filter, is selected that specifically improves alignment, and the area which contains said edge is encoded in corresponding filter location data. The depth filtering data may include various parameters.

Optionally, the depth filtering data includes a filter type. The filter type may, for example, be one of
 a temporal median filter over N frames;
 a spatial median, maximum, or minimum filter over M×N pixels;
 a Gaussian blur over M×N pixels;
 a Gaussian blur over a one dimensional kernel;
 a threshold filter for thresholding to at least one fixed value;
 a bilateral grid filter and an object mask for the bilateral grid filter;
 a gain or offset for the filter area.

The offset, when applied to the destination depth map, effectively moves objects backwards or forwards with respect to the plane of the display. Signaling the offset enables the source side to move objects in the filter area to any depth position, e.g. near the 3D display plane. The gain, when applied to the destination depth map, effectively moves all objects in the filter area away or towards the plane of the 3D display. For example the destination depth map may be defined to have a zero value for a depth at the display plane, and the gain may be applied as a multiplication to the values. Signaling the gain enables the source side to control movement of important objects with respect to the 3D display plane. The gain determines the difference between the closest and the farthest element in the filter area when displaying the 3D image. In the above the filter area may be determined by a rectangular area of M×N pixels (M,N being integers). As such, the various filter types are well known in the field of image processing.

Optionally, the depth filtering data includes a filter selection indicator, which indicates a type of problem that may be filtered out at the destination, or a specific detrimental effect that occurs in the specific area of the video. By indicating such effect or problem, the filter selection indicator enables the destination side to activate an appropriate filter operation to compensate for the detrimental effect. The filter selection indicator may for example be
 a temporal instability indicator indicative of an amount of motion in the filter area;
 an alignment indicator indicative of an amount of alignment between depth and luminance and/or chrominance;
 a graphic object indicator indicative of at least one graphic object in front of background video in the filter area.

As such, the various filters to be selected to counter well known depth related detrimental effects are well known in the field of image processing.

Optionally the depth filtering data may include one or more of
 filter coefficients;
 filter strength;
 parameters of the video in the filter area;
 parameters of a graphical object in the area.

As such, the various filter parameters are well known in the field of image processing. Parameters of the filter or of the objects and elements in the filter location area are known as such, e.g. indicating that pixels having the color blue in the filter location area are at maximum depth (e.g. blue sky), or color of a graphical object (menu, subtitles) in front of real live video.

Optionally, the depth filtering data may include the filter location data. The filter location data may be efficiently encoded, e.g. by at least one of a rectangular area indicating coordinates and/or width and height;

a two dimensional shape of a predetermined shape type, the shape type including at least one of a square, a circle, an ellipse, the location of the two dimensional shape indicated by at least a centre and radius;

a one dimensional shape, the location of the one dimensional shape indicated by at least one of coordinates of at least one point, a length, a direction including one of horizontal, vertical or angle;

a border area type indicating a transition between the filter area and surrounding video;

an area index identifying the respective filter area;

a geometric area for a bilateral depth filter;

object index parameters associated with a filter area to identify objects.

As such, the various filter location data are well known to define an area in an image.

Optionally the depth filtering data may include a filter activity indicator indicative of the timing or an operation in set of index including at least one of a start indicator indicative of a video frame to start filter processing;

a stop indicator indicative of a video frame to stop filter processing;

a period indicator indicative of period of time to apply filter processing;

an activity index indicative of applying filter processing in a filter area corresponding to the index.

As such, the various filter location data are well known to define a geometric area in an image.

The output unit 46 is arranged for including the depth filtering data in the video signal. A processor unit having the functions of the depth processor 42, the optional stereo-to-depth converter 48 and the output unit 46 may be called a 3D encoder.

The source device may be a server, a broadcaster, a recording device, or an authoring and/or production system for manufacturing optical record carriers like the Blu-ray Disc. The Blu-ray Disc provides an interactive platform for distributing video for content creators. Information on the Blu-ray Disc format is available from the website of the Blu-ray Disc association in papers on the audio-visual application format, e.g. http://www.blu-raydisc.com/assets/Downloadablefile/BD-ROM-AV-WhitePaper_110712.pdf. The production process of the optical record carrier further comprises the steps of providing a physical pattern of marks in tracks which pattern embodies the enhanced video signal that include the depth filtering data, and subsequently shaping the material of the record carrier according to the pattern to provide the tracks of marks on at least one storage layer.

The 3D video destination device 50 has a receiver for receiving the 3D video signal 41, which receiver has one or more signal interface units and an input unit 51 for parsing the incoming video signal. For example, the receiver may include an optical disc unit 58 coupled to the input unit for retrieving the 3D video information from an optical record carrier 54 like a DVD or Blu-ray disc. Alternatively (or additionally), the receiver may include a network interface unit 59 for coupling to a network 45, for example the internet, a home network or a broadcast network, such device being a set-top box or a mobile computing device like a mobile phone or tablet computer. The 3D video signal may be retrieved from a remote website or media server, e.g. the 3D source device 40. The 3D image processing device may be a converter that converts an image input signal to an image output signal having the required depth information. Such a converter may be used to convert different input 3D video signals for a specific type of 3D display, for example standard 3D content to a video signal suitable for autostereoscopic displays of a particular type or vendor. In practice, the device may be a 3D enabled amplifier or receiver, a 3D optical disc player, or a satellite receiver or set top box, or any type of media player.

The 3D destination device has a depth processor 52 coupled to the input unit 51 for processing the depth data corresponding to the video signal for generating a 3D display signal 56 to be transferred via an output interface unit 55 to the display device, e.g. a display signal according to the HDMI standard, see "High Definition Multimedia Interface; Specification Version 1.4a of Mar. 4, 2010", the 3D portion of which being available at http://hdmi.org/manufacturer/specification.aspx for public download.

The 3D destination device may have a video converter 53, e.g. a stereo-to-depth converter for generating a destination generated depth map based on the first and second video information, or a 2D to 3D converter for generating depth data from a 2D video signal. The operation of the stereo-to-depth converter is equivalent to the stereo-to-depth converter in the source device described above. The 2D to 3D converter generates depth data from a 2D video signal, which is known as such. A unit having the functions of the destination depth processor 52, the converter 53 and the input unit 51 may be called a 3D decoder.

The destination depth processor 52 is arranged for generating the depth data included in the 3D display signal 56 for display on the display device 60. The depth processor may be arranged for providing a destination depth map for enabling warping of views for the 3D display. The input unit 51 is arranged for retrieving depth filtering data from the 3D video signal, which depth filtering data is based on source depth information relating to the video information and represents a processing condition for processing the destination depth data in a filter area of the video indicated by the filter location data. The destination depth processor is arranged for processing the destination depth data, e.g. a depth map for warping of the views in dependence on the depth filtering data retrieved from the 3D video signal. The processing of depth filtering data is further elucidated below.

The 3D display device 60 is for displaying the 3D image data. The device has an input interface unit 61 for receiving the 3D display signal 56 including the 3D video data and the destination depth data from the 3D destination device 50. The device has a view processor 62 for generating multiple views of the 3D video data based on the video information in dependence of the destination depth map, and a 3D display 63 for displaying the multiple views of the 3D video data. The transferred 3D video data is processed in the processing unit 62 for warping the views for display on the 3D display 63, for example a multi-view LCD.

The video processor 62 in the 3D display device 60 is arranged for processing the 3D video data for generating display control signals for rendering one or more views. The views are generated from the 3D image data using one or more 2D views at a known position and the destination depth map. The process of generating a view for a different 3D display eye position, based on using a view at a known position and a depth map is called warping of a view. Alternatively the video processor 52 in a 3D player device may be arranged to perform said warping. The multiple views generated for the specified 3D display may be transferred with the 3D image signal via a dedicated interface towards the 3D display.

In a further embodiment the destination device and the display device are combined into a single device. The functions of the depth processor 52 and the processing unit 62, and the remaining functions of output unit 55 and input unit 61, may be performed by a single video processor unit.

It is noted that the depth filtering data principle can be applied at every 3D video transfer step, e.g. between a studio or author and a broadcaster who further encodes the now enhanced depth maps for transmitting to a consumer. Also the depth filtering data system may be executed on consecutive transfers, e.g. a further improved version may be created on an initial version by including second depth filtering data based on a further improved source depth map. This gives great flexibility in terms of achievable quality on the 3D displays, bitrates needed for the transmission of depth information or costs for creating the 3D content.

Figure 2:
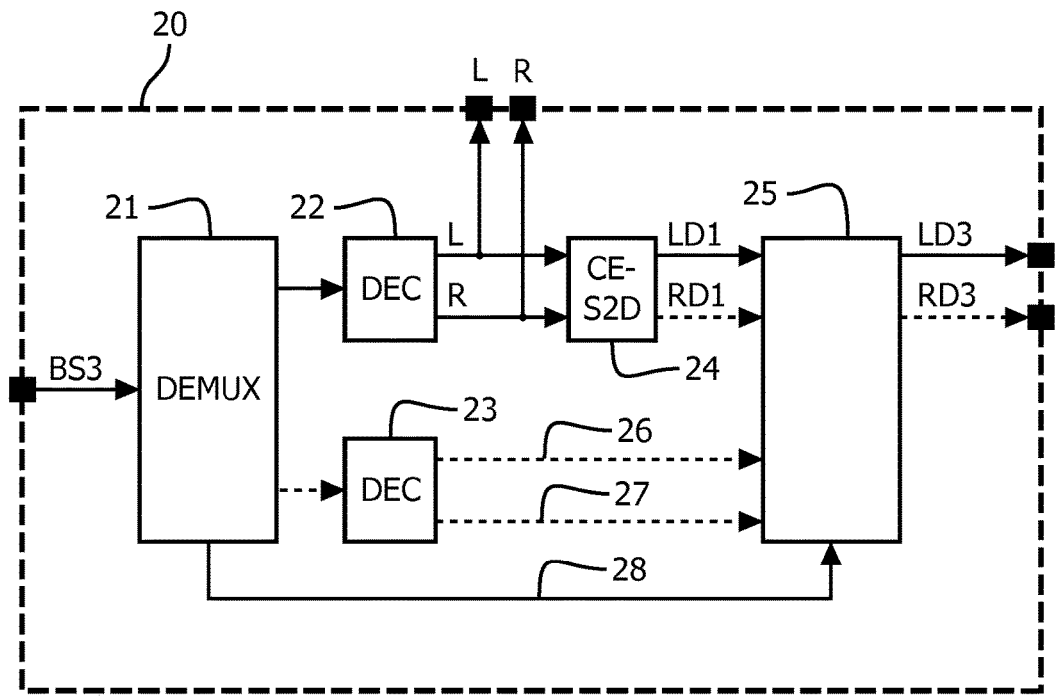
FIG. 2 shows a 3D decoder using depth filtering data.

FIG. 2 shows a 3D decoder using depth filtering data. A 3D decoder 20 is schematically shown having an input for a 3D video signal marked BS3 (base signal 3D). The 3D decoder may be part of a set top box (STB) at consumer side, and receives a bitstream according the depth filtering data system (BS3). An input demultiplexer 21 (DEMUX) parses the incoming data into bitstreams for the video data and the depth filtering data. A first decoder 22 (DEC, e.g. MVC/H.264) decodes the video data to video outputs L and R, which are also coupled to a consumer type stereo-to-depth converter (CE-S2D), which generates a first left depth map LD1 and a first right depth map RD1. Alternatively just a single first depth map is generated, or a depth map (e.g. a low resolution or a partial depth map) is directly available in the incoming signal. A second decoder 23 decodes the depth filtering data and provides depth control signals, in particular a filter location signal 26 and a depth filter signal 27. The depth control signals are coupled to depth map processor 25, which generates the destination depth map. Furthermore, the demultiplexer 21 may derive a filter activity indicator, e.g. based on a flag indicating the activation of depth filter in a specific area identified by an index. In the example a left destination depth map LD3 and a right destination depth map RD3 are provided by using the depth filtering data to modify the initial depth map LD1, RD1. The final destination depth map output of the 3D decoder (LD3/RD3) is then transferred to a 3D display device or a view-warping block as discussed with reference to FIG. 4.

Figure 3:
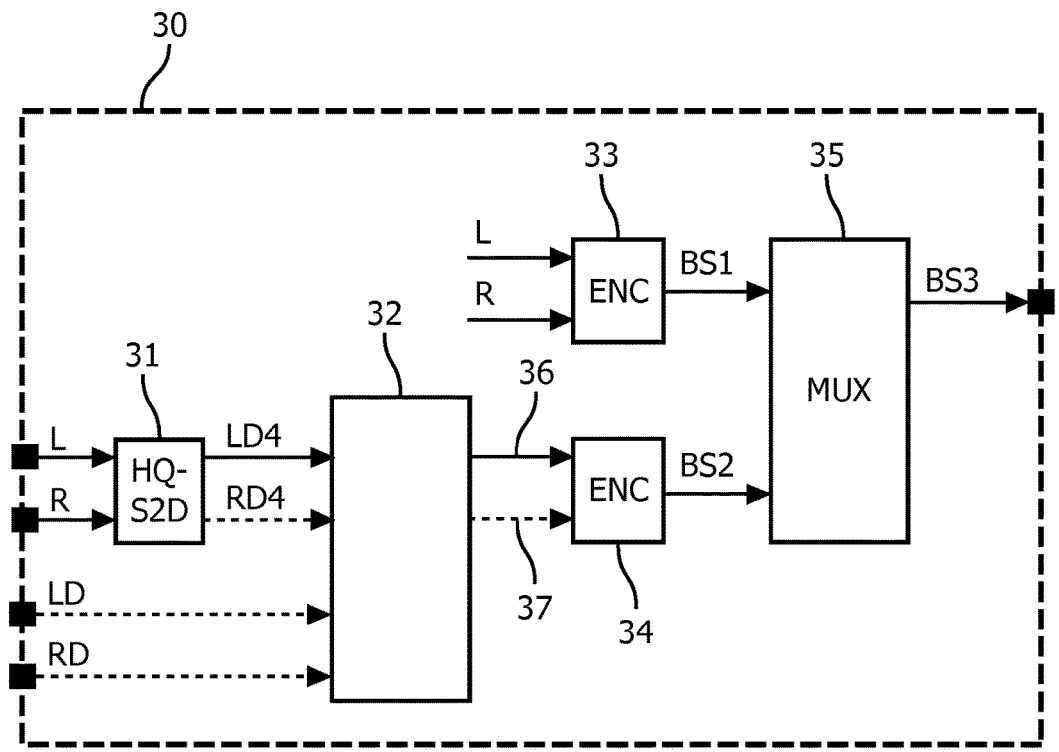
FIG. 3 shows a 3D encoder providing depth filtering data.

FIG. 3 shows a 3D encoder providing depth filtering data. A 3D encoder 30 is schematically shown having an input (L, R) for receiving a 3D video signal. A stereo-to-depth converter (e.g. a high-quality professional type HQ-S2D) may be provided to generate a left depth map LD4 and a right depth map RD4, called the source depth map. Alternatively a further input may receive further source depth data, which may be provided off-line (e.g. from camera input, manually edited or improved, or computed in case of computer generated content), or may be available with the input 3D video signal. A depth processing unit 32 receives the source depth map LD4, RD4 and/or the further source depth data and determines if, and for which location, depth filtering data is to be generated. In the example a depth filtering data signal 36 and a filter location signal 37 are coupled to an encoder 34. Various options for depth filtering data are given below.

After encoding the depth filtering data is included in the output signal by output multiplexer 35 (MUX). The multiplexer also receives the encoded video data bitstream (BS1) from a first encoder 33 and the encoded depth filtering data bitstream (BS2) from a second encoder 34, and generates the 3D video signal marked BS3.

Optionally, the source depth processor is arranged for generating a filter activity signal which indicates to apply the depth filtering data for a period of time, e.g. in dependence of a shot in the 3D video signal. Effectively the depth filtering data may apply to a period of the 3D video signal that has a same 3D configuration, e.g. a specific camera and zoom configuration. Usually the configuration is substantially stable during a shot of a video program. Shot boundaries may be known or can be easily detected at the source side, and a set of depth filtering data is advantageously assembled for the time period corresponding to the shot. Automatically detecting boundaries of a shot as such is known. Also the boundaries may already be marked or may be determined during a video editing process at the source. Depth filtering data may be provided for a single shot, and may be changed for a next shot. For example an offset value may be given for a close-up shot of a face, and the area of the face is indicated by the filter location data, which may be succeeded by different depth filtering data for a next shot of a remote landscape.

The source depth processor may be arranged for providing, as the filter location data, data indicative of an area that is aligned to at least one macroblock in the 3D video signal, the macroblock representing a predetermined block of compressed video data. The macroblocks represent a predetermined block of compressed video data, e.g. in an MPEG encoded video signal. Such area data will efficiently be encoded and processed.

In an embodiment the 3D video signal is formatted to include an encoded video data stream and arranged for conveying decoding information according to a predefined standard, for example the BD standard. The depth filtering data in the 3D video signal is included according to an extension of such standard as decoding information, for example in a user data message or a signaling elementary stream information [SEI] message as these messages are carried in the video elementary stream. Alternatively a separate table or an XML based description may be included in the 3D video signal. As the depth filtering data needs to be used when interpreting the depth map the signaling may be included in additional so called NAL units that form part of the video stream that carries the depth data. Such NAL units are described in the document "Working Draft on MVC extensions" as mentioned in the introductory part. For example a depth_range_update NAL unit may be extended with a table in which the Depth_Signaling data is entered.

Advantageously the 3D encoder 30 during the encoding process not only generates the source depth maps LD4 and RD4 using the high quality stereo-to-depth converter (HQ-S2D), but also mimics the behavior of the corresponding 3D decoder; i.e. the 3D encoder also reconstructs depth map(s) using the same stereo-to-depth algorithm(s) as would be implemented by the corresponding 3D decoder using the consumer type stereo-to-depth converter.

By using the depth maps of both the high-quality stereo-to-depth converter (or the exact depth maps if available) and the depth maps of the consumer type stereo-to-depth converter, the 3D encoder can iteratively, using one or more iterations configure the filtering. By means of a comparison the 3D encoder may e.g. identify areas within the depth map that may require filtering and/or may use these depth maps to more accurately define or parameterize filters.

It is noted that the above approach does require the 3D encoder to have access to the consumer type stereo-to-depth algorithm(s) in order to achieve the best possible results, but allows the 3D encoder to fine-tune the generation of the filter location signal 26 and/or the depth filter signal 27.

Figure 4:
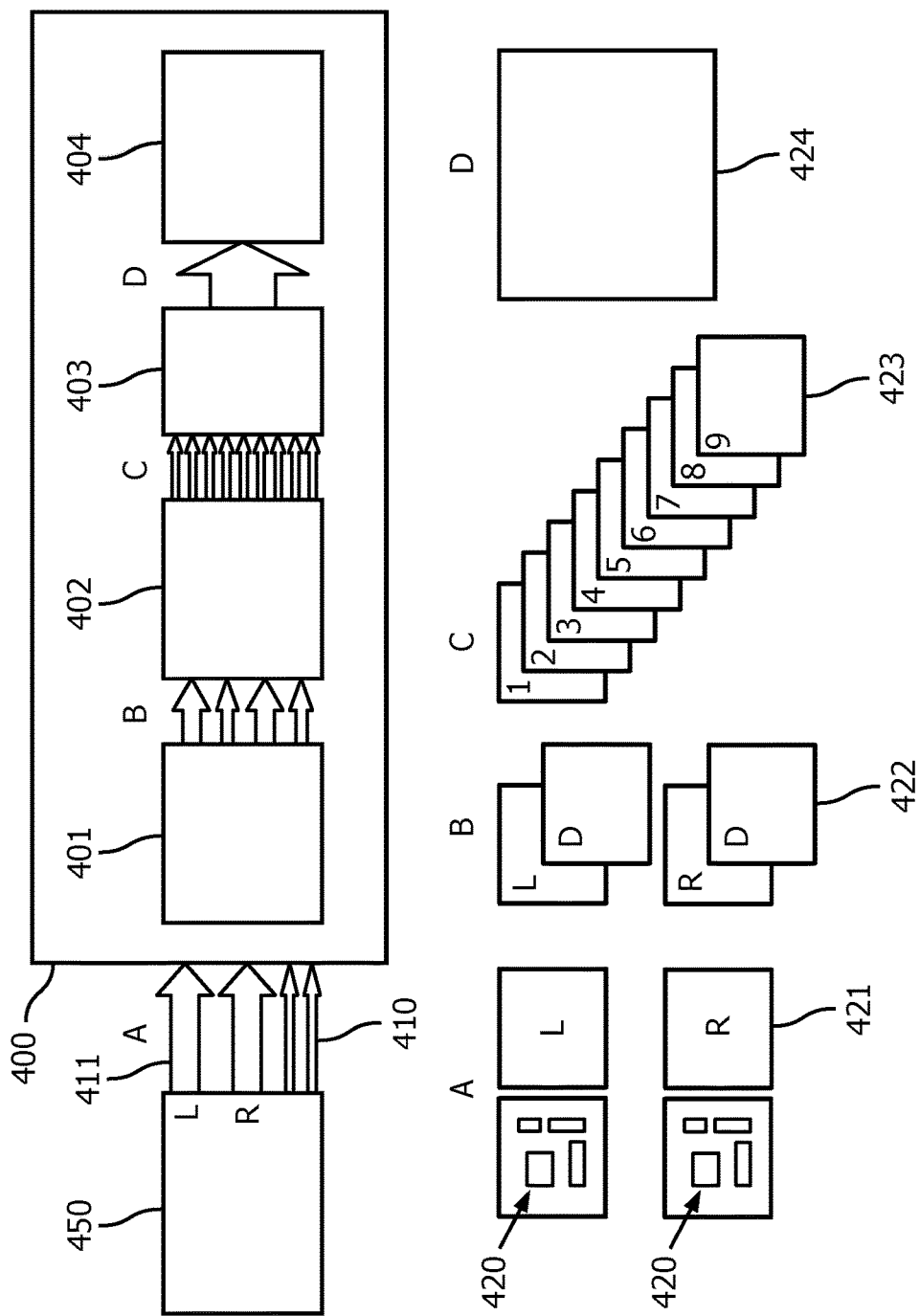
FIG. 4 shows a system having an auto-stereo display device and warping multiple views.

FIG. 4 shows a 3D display device and warping of multiple views. The 3D display device 400 receives left and right views 421 and depth filtering data 420, which may be transferred separately, or may be included in a multiplexed signal, on an interface between a BD player 450 and the 3D display device 400. As indicated at position A, the interface transfers the video data 411 and the depth filtering data 410 and may be according to the HDMI standard, extended to transfer RGB and Depth (RGBD HDMI). A destination depth map may be generated or processed by a depth processor 401 based on the depth filtering data 410. At position B the video data and depth map 422 are coupled to a view rendering unit 402, also called view warping unit. At position C multiple views 423 are coupled to view interleaver 403, which generates at position D an interleaved frame 424 to be coupled to an auto stereo display (ASD) 404. The interleaver maps the intermediate views onto the subpixels of the autostereoscopic display.

The left and right views 421 and depth filtering data 420 may be transferred separately, or may be included in a multiplexed signal, on the interface between a BD player 450 and the 3D display device 400. In the example the BD player has the role of 3D video source device, which provides the depth filtering data to the 3D display device 400 which has the role of destination device.

In practice, depth information is required for many 3D applications. It is used for depth adjustment on stereoscopic 3D displays, and for view generation in multi-view displays. Such depth information can be derived in multiple ways. It can be manually or automatically generated from 2D or (stereo) 3D input, it can be separately captured using depth range cameras, or extracted from computer graphics content. In 3D displays, an automatic conversion is often applied, converting 2D or (stereo) 3D content into 3D (stereo or multi-view). The first step of this process is typically automatic depth extraction. Most of these algorithms make errors at some locations, which can have multiple causes (homogeneous areas, ambiguous stereo matching, etc.). Traditionally, this requires manual corrections, which should be applied at the content creation/transmission side.

However, automatic depth estimation algorithms are not perfect, and may make noticeable errors at some locations. Assuming more accurate depth data is available at the content source side, such data could be transmitted to achieve higher performance. However, storing and transmitting depth data requires considerable bandwidth.

Instead of transmitting depth maps, local errors due to depth estimation algorithms can be overcome by guided post-processing, e.g. filtering operations, such as median, blur, etc. Thereto location and filter parameters to apply are transferred from the source to the destination, and are applied at the receiver side after the automatic depth generation algorithm. In this way, the data to be transmitted is reduced to a low amount, while artifacts can be adequately addressed.

Example filters and location data for practical use include:
Temporal median filter over N frames;
Spatial median/maximum/minimum filter over M×N pixels;
Gaussian blur filter over M×N pixels;
Gaussian blur filter with a 1D kernel, of which the filter direction may be in horizontal, vertical, or in a specific direction (indicated by an angle);
Thresholding filter, to apply a threshold to a fixed value or a set of fixed values;
Bilateral grid filter and an object mask (e.g. for graphics objects);
Gain and/or offset filtering within a specified filter area;
Geometric areas to be used, e.g. in bilateral depth filtering (such as replacing luma in cross luma-depth bilateral filter where these geometries are defined).

Index parameters associated with each geometric area can be used to identify objects. Identifying objects enhances depth processing for graphics overlays where it is normally difficult to do accurate depth estimation.

The above filters may be indicated by a filter type indicator, coefficients and/or possible parameters (e.g. strength). Respective sets of filters and areas may be indexed.

Figure 5:
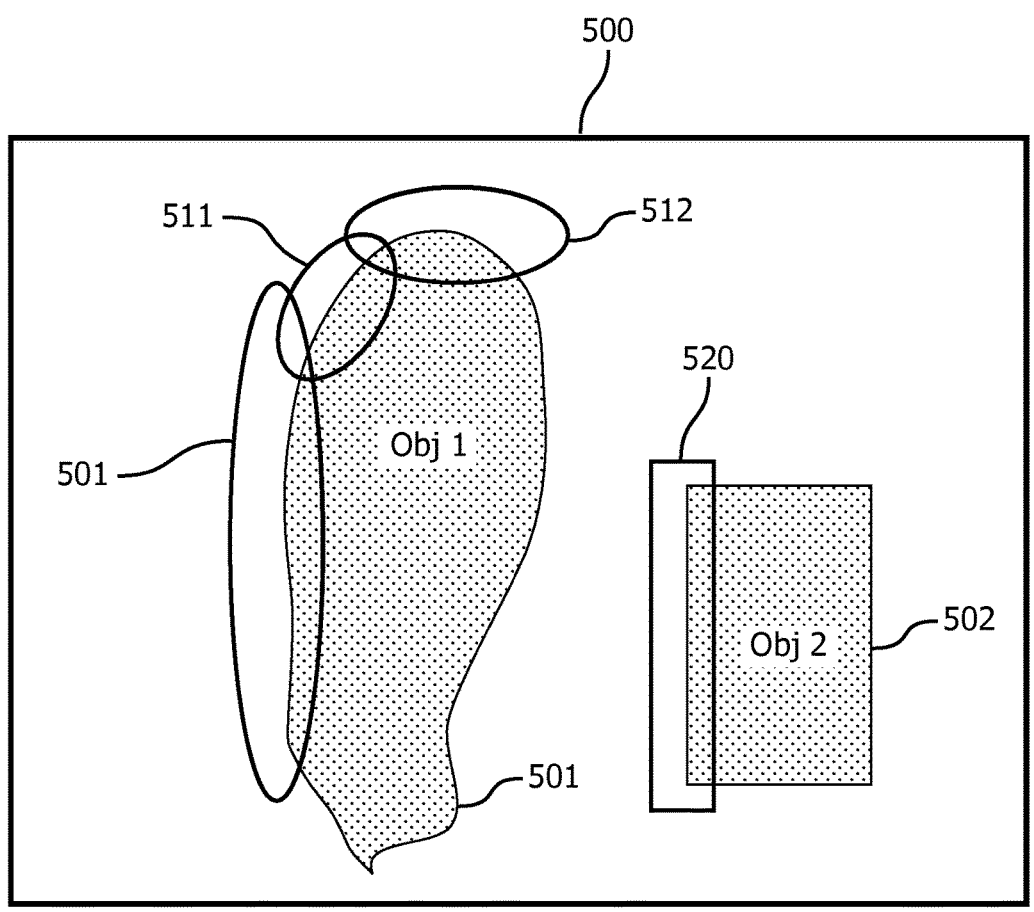
FIG. 5 shows an example of video data and filter location data.

FIG. 5 shows an example of video data and filter location data. In a video frame 500 two objects are visible, a first object 501 (Obj1) having a natural, curved shape, and a second object 502 (Obj2) having a rectangular shape. A first set of filter location data is defined as three, overlapping elliptical shapes 510, 511, 512 positioned along the boundary of the first object. A filter type may be determined which is effective to filter out any disturbing errors at the boundary of the object. The filter type and the geometric data 510, 511, 512 constitute a first set of depth filter data. The boundary area of the second object 520 is effectively covered by a different geometric shape C, rectangle 520. A second filter type may be determined which is effective to filter out any disturbing errors at the boundary of the second object. The second filter type and the corresponding geometric data 520 constitute a second set of depth filter data.

Figure 6:
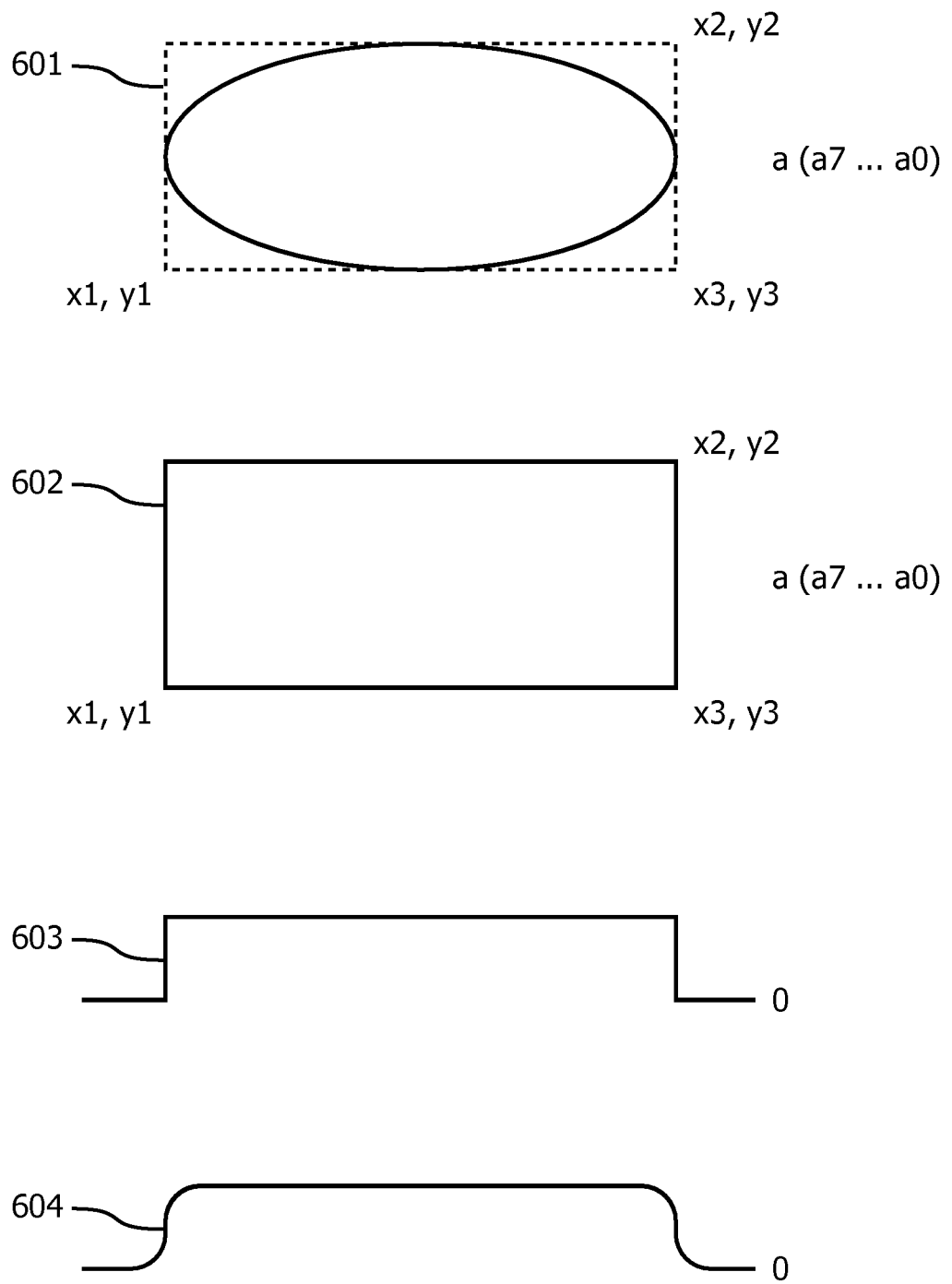
FIG. 6 shows examples of filter location data.

FIG. 6 shows examples of filter location data. The Figure shows a first geometrical shape 601 being an ellipse, which is defined by three pairs of coordinates x1,y1; x2,y2; x3,y3. The coordinates enable to define the ellipse in arbitrary position in the image, i.e. also at an angle with respect to the horizontal direction. A second geometrical shape 602 is a rectangle, which is defined by three pairs of coordinates x1,y1; x2,y2; x3,y3. The coordinates enable to define the rectangle in arbitrary position in the image. Hence three coordinate pairs determine the (rotated) rectangle or ellipse within. It is noted that further geometrical shapes may be predefined for describing the filter area, such as a line, spline (curved line having a radius) or predefined curve.

A third shape 603 is a pattern to define the boundary of a filter area. The third shape indicates the transition between the filter area and the surrounding depth, which is a sharp transition. The upper level of the curve indicates that the filter operation is 100%, and the zero level indicates that the depth is not processed by the filter. A fourth shape 604 indicates the transition between the filter area and the surrounding depth, which is a soft transition.

Each shape may also have an index value in a byte a(a7 . . . a0). Further parameters (like a,b, . . . ) determine the filter type, filter action, strength, active or de-activate, etc. The set of parameters (filter location data and filter description data) x1,y1,x2,y2,x3,y3,a,b, . . . may be embedded in the video stream e.g. by SEI messages.

In said index value also an activity indicator may be embodied. For example, a start indicator (e.g. msbit=1, which most significant bit is bit 7 of parameter a, i.e. a(7) of the index byte) may indicate that the area is active for the upcoming frames until stopped. The activity may be stopped by an area index byte with a stop indicator (e.g. msbit=0). In this way not for every frame the SEI message has to be repeated, which achieves a further reduction of the bitrate.

The activity indicator may also indicate that a filter in an earlier defined filter area is to be reactivated, or that one or more of a set of different filters is to be activated. The activity indicator may also be used to erase an earlier defined filter or filter area.

The filter is applied only within a specified part of the image, called the filter area. Such area can be specified as a rectangular area 520 by indicating coordinates and width and height, as shown in FIG. 5, or (a series of) square or circular blobs or ellipses 510,511,512 determined by their center and radius. Also, the filter may be applied along lines by specifying coordinates and filtering direction. The areas could also have a specific transition, e.g. a soft transition 604, along the borders (indicated via a6 . . . a0). The transition makes use of mixing between original depth (0%) and processed (100%) depth.

When the geometric parameters overlap, both operations may be carried out separately on the original input depth data, and then the results are mixed. Alternatively a sequential operation may be defined, e.g. based on the sequential order of the index values. The sequence and/or priority of such overlapping filter operations may be defined by a further parameter.

Figure 7:
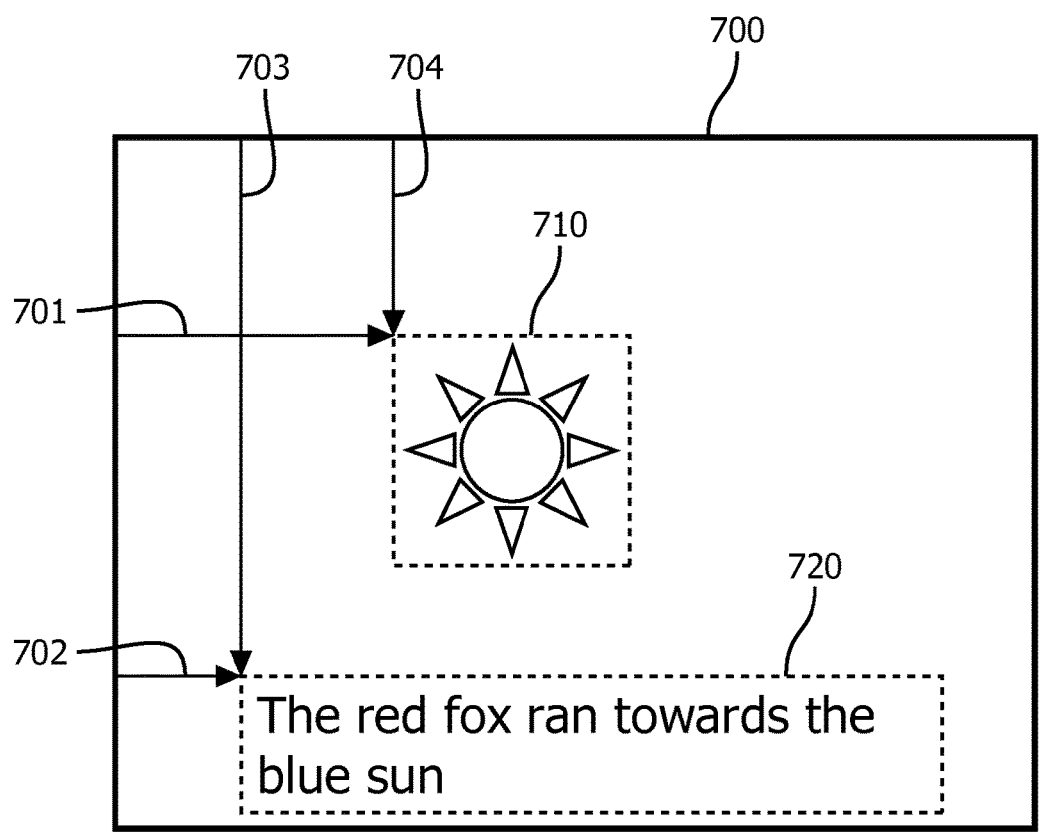
FIG. 7 shows an example of a filter selection indicator.

FIG. 7 shows an example of a filter selection indicator. The Figure shows an image having an origin 700. The image has to filter selection indicators, a first indicator being a graphics indicator 710 that has a filter area indicated by a horizontal coordinate 704 and a vertical coordinate 701. A second filter selection indicator 720 being a graphics indicator that has a filter area indicated by a horizontal coordinate 704 and a vertical coordinate 701. The respective size of the filter area may be further defined as indicated above. The type of graphics may be represented by a graphic type parameter, e.g. the first graphics indicator being an object type and the second graphics indicator being a subtitle. Further parameters may indicate the color and/or luminance values of the graphics. The filter selection indicator enables the destination to activate a filter that is appropriate for improving depth estimation taking into account that the graphics object has a sharp boundary with respect to the surrounding video.

A problem with converting stereoscopic video with a stereoscopic graphics foreground to multiview video is that around the edges of the graphics visual artifacts will appear due to errors in the stereo to multiview conversion process. As graphics typically have strong edges and a big depth gap to the video content, any visual artifacts on those edges will be perceptible to the common user. One type of error that is especially noticeable is spurious fluctuation of disparities over time. These temporal inconsistencies are often caused by disparity estimation on low texture surfaces. At the destination, that the depth processor, e.g. the stereo to multiview conversion component, uses the filter selection indicator and filter area to improve the estimation (and filtering) of the disparity maps.

Next it is described how the filter selection indicator and the filter location data can be used to improve the processing in the disparity estimation process for the graphics type. A first assumption is that the graphics overlay will almost always be in front on the video. Secondly inside the graphics regions the depth does not show any sudden jumps and is more or less continuous. Using these assumptions a different disparity estimation of for the filter area having graphics is used. Alternatively the disparity estimation is performed in one step but with specific parameters based on the graphics overlay location. If, for instance, the stereo estimation problem is formulated as an energy minimization problem, then the graphics location metadata can be incorporated into the energy (cost) function, by:

Setting the occlusion cost (if available) to high (i.e. discourage) or infinity (i.e. disallow) within the graphics object, and very low (i.e. encourage) on the borders.

Setting the spatial smoothness cost for unequal disparities higher within the graphics object, Setting the spatial smoothness cost to zero on the border between the graphics and the video, Setting the temporal smoothness cost (if available) higher within the graphics object, The above cost elements may be combined. It should be understood that almost all stereo estimation methods can be formulated as an energy minimization problem. Part of those methods are in the form of a Markov random field (MRF) that can be solved by well-known MRF optimization methods such as belief propagation and max flow/min cut with $\alpha$-expansion, as described further in the document "Daniel Scharstein and Richard Szeliski, A Taxonomy and Evaluation of Dense Two-Frame Stereo Correspondence Algorithms, Microsoft Research, November 2001".

If the stereo estimation method is based on 3D Recursive Search (based on surrounding blocks), then the graphics location metadata can be incorporated by adjusting the penalties based on whether disparity candidates are crossing a graphics border.

Temporal consistency may be further improved by appropriate filtering, for example a bilateral grid with an exponential decay. In this case, the post processing can be improved by:

Processing graphics and video separately,

Filling and reading the bilateral grid only for non-graphics part,

Using (planar or B-spline) surface modeling for the graphics part,

Adjusting the decay (temporal smoothing) factor for each grid bin separately based on if that bin is part of the graphics object.

In summary, the depth filtering data enables the rendering process to get better results out of the depth data for the actual 3D display, while adjustments are still controlled by the source side. The depth filtering data may consist of filter parameters or depth characteristics relevant to process the depth data in the 3D display, and filter location data to indicate the position in the image where the filter is to be applied.

It is noted that the current invention may be used for any type of 3D image data, either still picture or moving video. 3D image data is assumed to be available as electronic, digitally encoded, data. The current invention relates to such image data and manipulates the image data in the digital domain.

The invention may be implemented in hardware and/or software, using programmable components. Methods for implementing the invention have steps corresponding to the functions defined for the system as described with reference to FIGS. 1-4.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. Video source device for providing a video signal representing video for transferring to a three dimensional [3D] video destination device, the source device comprising
   an output unit for generating the video signal, and for transferring the video signal to the destination device,
the destination device comprising
   a receiver for receiving the video signal,
   a destination depth processor for providing destination depth data, wherein the source device comprises
   a source depth processor for providing depth filtering data including filter location data, the depth filtering data representing a processing condition for processing the destination depth data in a filter area of the video indicated by the filter location data,
and the output unit is arranged for transferring the depth filtering data to the destination device, and the destination depth processor is arranged for
   processing, in dependence on the depth filtering data, the destination depth data in an area of the video indicated by the filter location data.

2. Video source device as claimed in claim 1, wherein the source depth processor is arranged for providing, in the depth filtering data, a filter type including at least one of
   a temporal median filter over N frames;
   a spatial median, maximum, or minimum filter over M×N pixels;
   a Gaussian blur over M×N pixels;
   a Gaussian blur over a one dimensional kernel;
   a threshold filter for thresholding to at least one fixed value;
   a bilateral grid filter and an object mask for the bilateral grid filter;
   a gain or offset filter.

3. Video source device as claimed in claim 1, wherein the source depth processor is arranged for providing, in the depth filtering data, a filter selection indicator including at least one of
   a temporal instability indicator indicative of an amount of motion in the filter area;
   an alignment indicator indicative of an amount of alignment between depth and luminance and/or chrominance;
   a graphics indicator indicative of at least one graphic object in front of background video in the filter area.

4. Video source device as claimed in claim 2, wherein the source depth processor is arranged for providing, in the depth filtering data, filter parameter data including at least one of
   filter coefficients;
   filter strength;
   parameters of the video in the filter area;
   parameters of a graphical object in the area.

5. Video source device as claimed in claim 1, wherein the source depth processor is arranged for providing, in the depth filtering data, the filter location data including at least one of
   a rectangular area indicating coordinates and/or width and height;
   a two dimensional shape of a predetermined shape type, the shape type including at least one of a square, a circle, an ellipse, a location of the two dimensional shape indicated by at least a centre and radius;
   a one dimensional shape, a location of the one dimensional shape indicated by at least one of coordinates of at least one point, a length, a direction including one of horizontal, vertical or angle;
   a border area type indicating a transition between the filter area and surrounding video;
   an area index identifying the respective filter area;
   a geometric area for a bilateral depth filter;
   object index parameters associated with a filter area to identify objects.

6. Video source device as claimed in claim 1, wherein the source depth processor is arranged for providing, in the depth filtering data, a filter activity indicator including at least one of
   a start indicator indicative of a video frame to start filter processing;
   a stop indicator indicative of a video frame to stop filter processing;
   a period indicator indicative of period of time to apply filter processing;
   an activity index indicative of applying filter processing in a filter area corresponding to the index.

7. Video source device as claimed in claim 1, wherein the output unit is arranged for generating, as the video signal, at least one of
   a display signal for interfacing to a 3D display device;
   a transfer signal for transferring via a broadcast network or internet;
   a record carrier signal represented by optically readable marks on a record carrier.

8. Three dimensional [3D] video destination device for processing a video signal representing video received from a video source device,
   the source device comprising
      an output unit for generating the video signal, and for transferring the video signal to the 3D destination device,
   the destination device comprising
      a receiver for receiving the video signal,
      a destination depth processor for providing destination depth data, wherein the 3D source device comprises
      a source depth processor for providing depth filtering data including filter location data, the depth filtering data representing a processing condition for processing the destination depth data in a filter area of the video indicated by the filter location data, and the output unit is arranged for transferring the depth filtering data to the destination device, and the destination depth processor is arranged for processing, in dependence on the depth filtering data, the destination depth data in an area of the video indicated by the filter location data.

9. 3D video destination device as claimed in claim 8, wherein the destination depth processor comprises, for providing the destination depth data, at least one of
- a 2D to 3D converter for generating 3D video data from a 2D video signal;
- a depth map generator for generating a depth map from a video signal comprising first video information representing a left eye view on a 3D display, and second video information representing a right eye view on the 3D display;
- a view warper for warping of multiple views for an autostereoscopic 3D display.

10. 3D video destination device as claimed in claim 8, wherein the device comprises at least one of
- a read unit for reading a record carrier for receiving the video signal,
- a 3D display for displaying of 3D video data.

11. Method of providing a video signal representing video for transferring to a three dimensional [3D] video destination device, the destination device comprising
- a receiver for receiving the video signal,
- a destination depth processor for providing destination depth data, the method comprising
- generating the video signal and transferring the video signal to the destination device,
- providing depth filtering data including filter location data, the depth filtering data representing a processing condition for processing the destination depth data in a filter area of the video indicated by the filter location data,
- and transferring the depth filtering data to the destination device, and wherein the destination depth processor is arranged for
- processing, in dependence on the depth filtering data, the destination depth data in an area of the video indicated by the filter location data.

12. Method of processing a video signal representing video received from a video source device, the source device comprising
- an output unit for generating the video signal,
- a source depth processor for providing depth filtering data including filter location data, the depth filtering data representing a processing condition for processing the destination depth data in a filter area of the video indicated by the filter location data, and the output unit is arranged for transferring the depth filtering data to the destination device, and the method comprises
- receiving the video signal,
- providing destination depth data,
- processing, in dependence on the depth filtering data, the destination depth data in an area of the video indicated by the filter location data.

13. Video signal representing video for transferring to a three dimensional [3D] video destination device, the destination device comprising
- receiver for receiving the video signal,
- a destination depth processor for providing destination depth data, the video signal comprising
- depth filtering data including filter location data, the depth filtering data representing a processing condition for processing the destination depth data in a filter area of the video indicated by the filter location data, and wherein the destination depth processor is arranged for
- processing, in dependence on the depth filtering data, the destination depth data in an area of the video indicated by the filter location data.

14. Record carrier comprising the three dimensional [3D] video signal as claimed in claim 13.

15. Computer program product for processing a video signal, which program is operative to cause a processor to perform the respective steps of the method as claimed in claim 11.

* * * * *